United States Patent
Kammans

(10) Patent No.: US 8,786,948 B2
(45) Date of Patent: Jul. 22, 2014

(54) APPARATUS FOR ILLUMINATING A RETICLE

(75) Inventor: Sigrun Kammans, Herborn (DE)

(73) Assignee: Leica Camera AG, Solms (DE)

( * ) Notice: Subject to any disclaimer, the term of this patent is extended or adjusted under 35 U.S.C. 154(b) by 251 days.

(21) Appl. No.: 13/050,258

(22) Filed: Mar. 17, 2011

(65) Prior Publication Data

US 2011/0228395 A1  Sep. 22, 2011

(30) Foreign Application Priority Data

Mar. 19, 2010  (DE) .................. 20 2010 003 869 U

(51) Int. Cl.
  *G02B 23/14* (2006.01)
  *G02B 27/34* (2006.01)
  *F41G 1/34* (2006.01)

(52) U.S. Cl.
  CPC ............... *G02B 23/14* (2013.01); *G02B 27/34* (2013.01); *F41G 1/345* (2013.01)
  USPC .............. 359/424; 359/399; 359/428; 42/122

(58) Field of Classification Search
  CPC .......... G02B 23/14; G02B 27/34; F41G 1/30; F41G 1/345
  USPC .......................... 359/399–428, 838, 850–861
  See application file for complete search history.

(56) References Cited

U.S. PATENT DOCUMENTS

| | | | | |
|---|---|---|---|---|
| 4,214,371 A | * | 7/1980 | Bush | ................................ 42/123 |
| 4,710,636 A | * | 12/1987 | Martino | ..................... 250/467.1 |
| 2002/0163791 A1 | | 11/2002 | Hoelen et al. | |
| 2006/0092507 A1 | * | 5/2006 | Menges et al. | ................ 359/428 |
| 2008/0186485 A1 | * | 8/2008 | Stenton | ......................... 356/251 |
| 2009/0109529 A1 | * | 4/2009 | Robitaille | ..................... 359/428 |
| 2012/0113507 A1 | * | 5/2012 | Arai | ............................. 359/428 |

FOREIGN PATENT DOCUMENTS

| | | |
|---|---|---|
| DE | 25 29 418 A1 | 1/1976 |
| EP | 0 886 163 B1 | 4/2004 |
| EP | 1 653 271 B1 | 8/2008 |
| GB | 402 825 A | 12/1933 |
| GB | 1 515 553 A | 6/1978 |
| WO | WO 2011/004709 A1 | 1/2011 |

* cited by examiner

*Primary Examiner* — Thong Nguyen
(74) *Attorney, Agent, or Firm* — Foley & Lardner LLP

(57) ABSTRACT

An apparatus for illuminating a marking, which is applied on a transparent reticle in the form of a diffraction structure, wherein illuminating beams are injected into the reticle via a side edge surface of the reticle such that they are emitted after diffraction at the marking perpendicular to the plane of the reticle, wherein a concavely curved mirror having two focal points is attached to the side edge surface such that a light source is arranged in the region of the first focal point and the marking is arranged in the region of the second focal point, wherein a second mirror having two focal points is attached such that a second light source with a second emission wavelength is arranged in the first focal point thereof and the marking is arranged in the region of the second focal point of the second mirror.

2 Claims, 2 Drawing Sheets

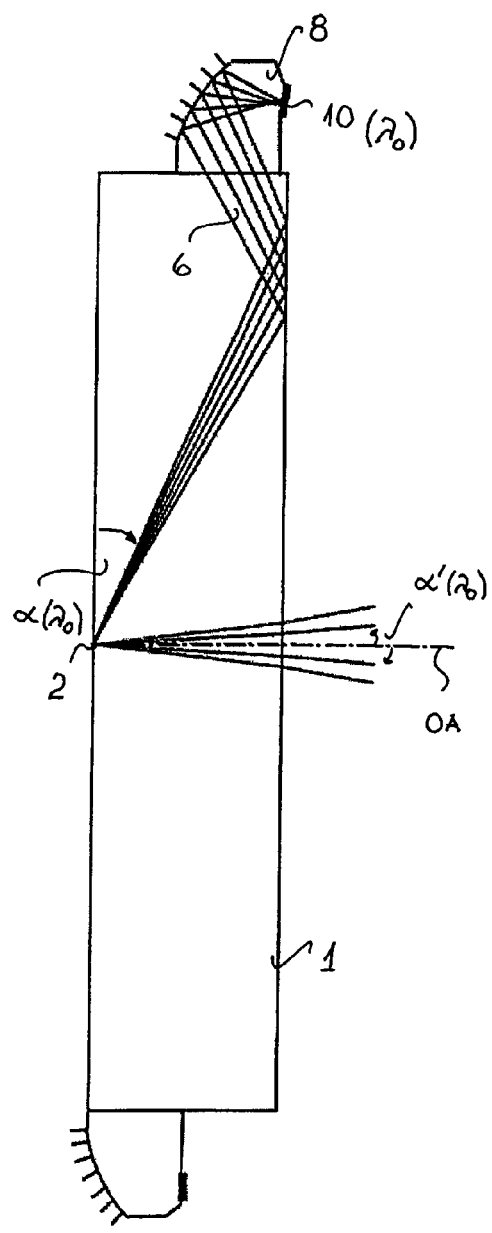
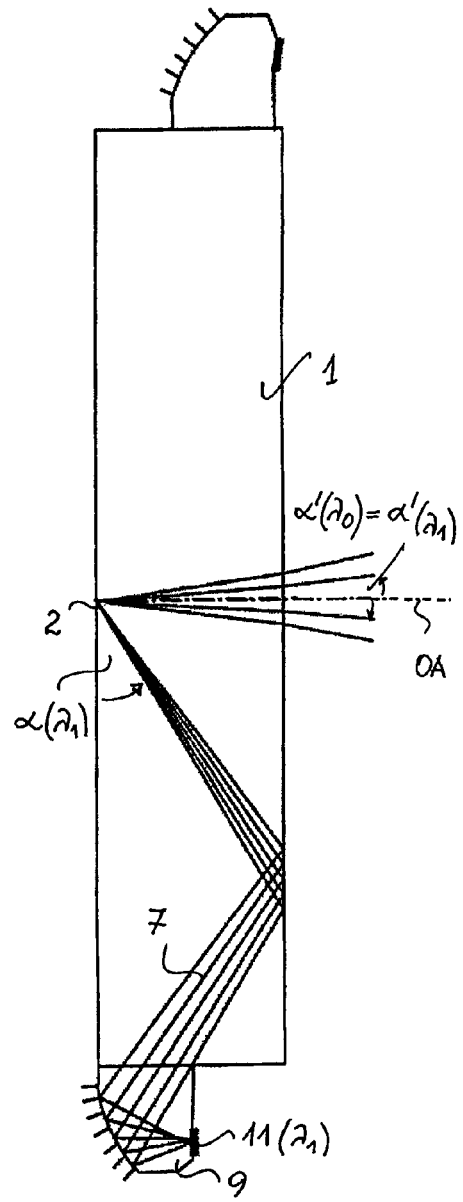
Fig. 2
Fig. 3

APPARATUS FOR ILLUMINATING A RETICLE

CROSS-REFERENCE TO RELATED PATENT APPLICATIONS

The right of foreign priority is claimed under 35 U.S.C. §119(a) based on Federal Republic of Germany Application No. 20 2010 003 869.3 filed Mar. 19, 2010, the entire contents of which, including the specification, drawings and claims are incorporated herein by reference.

BACKGROUND OF THE INVENTION

The invention relates to an apparatus for illuminating a marking, which is applied on a planar transparent reticle in the form of a diffraction structure.

EP 0 886 163 B1 discloses an optical device having an illuminated reticle. The reticle consists of a planar transparent carrier plate, onto which a marking which is in the form of a diffraction structure is applied. Reticles are used especially in sighting telescopes for marking a target. The marking is located in an intermediate image plane of the sighting telescope. The marking can be applied, in the direction of light of the sighting telescope, on the front or back of the carrier plate.

The marking is illuminated through the edge surface of the carrier plate by a light source which is arranged laterally to the carrier plate. Owing to the action of the diffraction structure, the illuminating beams are directed, in the first order of diffraction, in the direction of the optical axis of the sighting telescope toward the observer, with the result that the marking becomes visible to the observer in the intermediate image.

EP 1 653 271 B1 discloses an illuminating apparatus, with which the illumination of the diffraction structure of the known reticle is improved with the result that greater brightness and greater contrast of the marking in the intermediate image are achieved. The illuminating apparatus consists of a mirror, arranged laterally next to the carrier plate of the marking, having a mirror surface which is curved such that the mirror has two focal points. The light source is located in the region of one focal point. The light beams reflected by the mirror converge toward the marking which is located in the second focal point of the mirror. Depending on the position of the marking on the front or back surface (in the direction of light) of the carrier plate, the light beams are directed onto the marking immediately or after one or more total internal reflections on an inside surface of the carrier plate.

The mirror surface is preferably intended to be arranged on the back of a mirror element onto which light is emitted from the front by the light source. Preferably a light-emitting diode with a prespecified emission wavelength is provided as the light source. The mirror element can be attached to the edge of the carrier plate especially by way of adhesive bonding. The light-emitting diode can be connected to the front of the mirror element.

SUMMARY OF THE INVENTION

The invention was based on an object of expanding the apparatus in a manner such that the same marking can be displayed in various colors.

This object is achieved in an apparatus of the type mentioned in the introduction according to the invention.

Further objects, features and advantages of the present invention will become apparent from the detailed description of preferred embodiments that follows, when considered together with the accompanying figures of drawing.

BRIEF DESCRIPTION OF THE DRAWINGS

The drawings show a schematic exemplary embodiment of the illuminating apparatus according to the invention. Here, FIG. 2 shows a beam bundle injected via a first coupling-in region and FIG. 3 shows a beam bundle injected via a second coupling-in region.

DETAILED DESCRIPTION OF THE PREFERRED EMBODIMENTS

Figure 1:
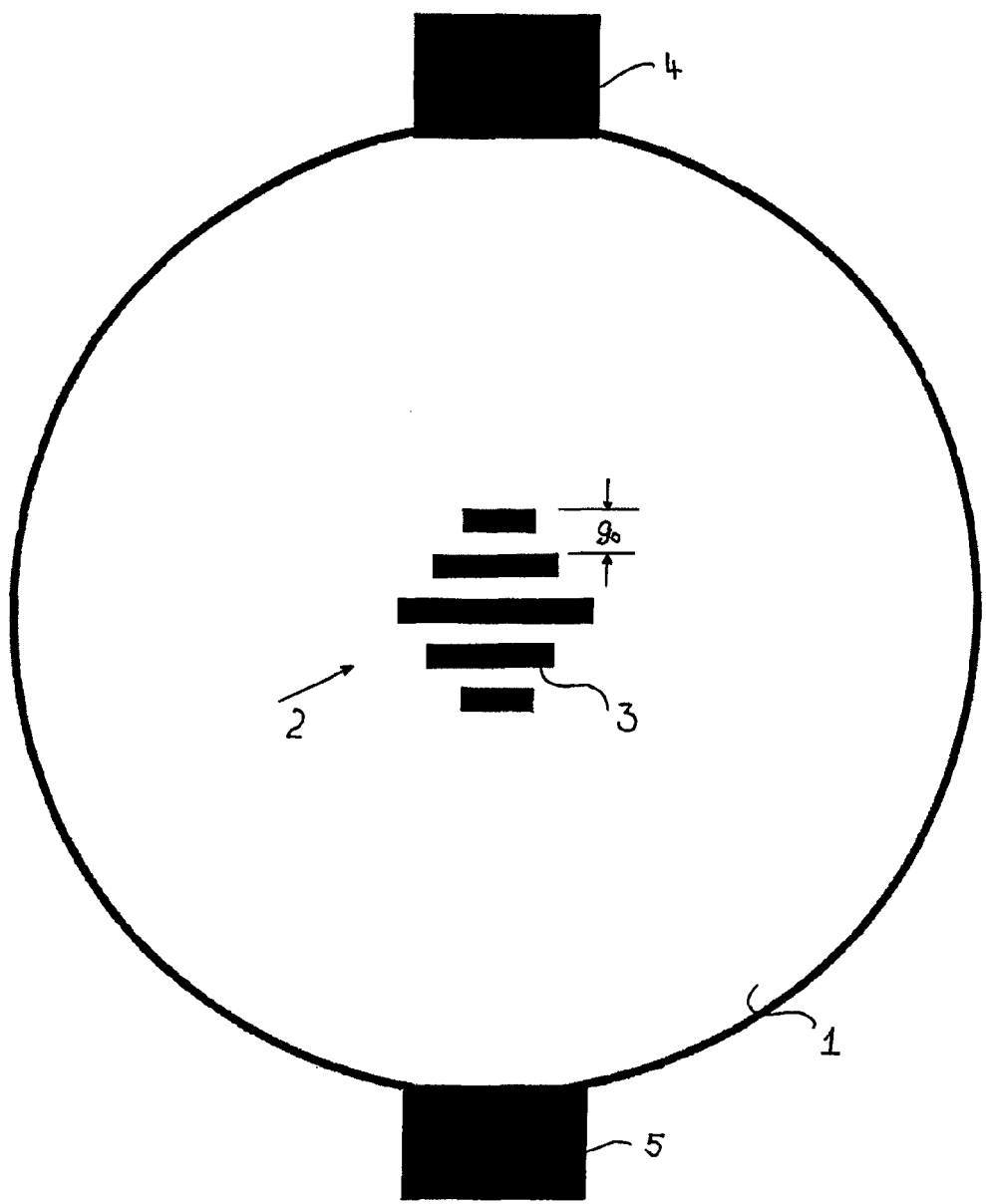
FIG. 1 shows a top view of a reticle having two coupling-in regions.

FIG. 1 shows, in top view, a reticle 1 having a grating structure 3 located in the surface region 2. The surface region 2 has a diameter of about 1.6 mm, for example, and appears in the diffraction pattern as a luminous point. Two coupling-in elements 4, 5, which each represent an illuminating system comprising a mirror element and an LED and are located diametrically opposed to one another, are molded onto the reticle 1. With identical grating structure 3, the coupling-in elements 4, 5 can be designed for different wavelengths of the LED and thus for different color displays of the marking.

This arrangement is based on the following principles relating to the diffraction of a light beam on a grating, which are described by the grating equation:

$$m \cdot \lambda = n \cdot g \cdot \sin \alpha + n' \cdot g \cdot \sin \alpha'$$

Here, $\alpha$ represents the angle of incidence under which the illuminating beam strikes the plane of the grating structure, $\alpha'$ the emission angle of the diffracted beam with respect to the perpendicular to the grating structure, g the grating constant, $\lambda$ the wavelength of the illuminating beam, n the refractive index of the medium upstream of the grating, n' the refractive index of the medium downstream of the grating in the direction of light and m the order of diffraction. If the grating structure is reflective and radiation is incident inside the carrier plate, then n'=n. If the grating is transmissive and radiation is incident inside the carrier plate, then n'=1.

If, as described in the previous exemplary application, the emission angle $\alpha'$ is intended to run along the optical viewing axis, then $\alpha'=0$ and the grating equation is reduced to $$m \cdot \lambda = n \cdot g \cdot \sin \alpha$$

For the illumination of a grating structure, a specific wavelength $\lambda_0$, a refractive index n of the carrier plate, a suitable grating constant $g_0$ and an associated angle of incidence $\alpha_0$ need to be defined.

Thus, the emission angle $\alpha'$ is a function of the wavelength $\lambda$, and of the defined constant parameters, specifically of the grating constant $g_0$, of the angle of incidence $\alpha_0$ and of the refractive index n of the carrier plate.

$$\alpha'(\lambda) = \arcsin\left(\frac{m \cdot \lambda - n \cdot g_0 \cdot \sin\alpha_0}{n \cdot g_0}\right) \text{ (reflective grating)}$$

$$\alpha'(\lambda) = \arcsin\left(\frac{m \cdot \lambda - n \cdot g_0 \cdot \sin\alpha_0}{g_0}\right) \text{ (transmissive grating)}$$

This wavelength-dependence of the emission angle $\alpha'$ is the reason why multicolour LED illumination emanating from a fixed position of the LED produces different emission angles α'. As a result, some considerable deviations in the parallax occur for the viewer of the target point displayed by the grating structure. Therefore, great importance must be attached to a narrow-band emission characteristic when selecting the LED.

If the emission angle α' for all colors is intended to run along the optical axis OA, i.e. α'(λ)=const=0, the angle of incidence α is a function of the wavelength λ, of the grating constant $g_0$, of the used order of diffraction $m_0$ and of the refractive index n of the carrier plate:

$$\alpha(\lambda) = \arcsin\left(\frac{m_0 \cdot \lambda}{n \cdot g_0}\right)$$

The grating constant $g_0$ and the refractive index n are pre-specified here as constant. The angle difference $$\Delta\alpha(\lambda_1, \lambda_2) = \alpha(\lambda_1) - \alpha(\lambda_2) = \arcsin\left(\frac{m_0 \cdot \lambda_1}{n \cdot g_0}\right) - \arcsin\left(\frac{m_0 \cdot \lambda_2}{n \cdot g_0}\right)$$

thus results for the difference between the necessary angles of incidence Δα for illumination with two different colors.

According to the invention, in addition to a first illumination with the wavelength $\lambda_0$ a second illumination with the wavelength $\lambda_1$ is provided by arranging an LED with the wavelength $\lambda_1$ on that side of the carrier plate 1 perpendicular to the grating structure 14 which is located opposite the LED with the wavelength $\lambda_0$. By means of a correspondingly adapted coupling-in and imaging apparatus, using the $-m_0$-th order of diffraction, the diffraction structure is irradiated under the angle $$\alpha(\lambda_1) = \arcsin\left(\frac{-m_0 \cdot \lambda_1}{n \cdot g_0}\right).$$

This ensures that the following is true for both emission angles:

α'($\lambda_0$)=α'($\lambda_1$)=0

In FIG. 2 and FIG. 3, the different values for the angles of incidence α ($\lambda_0$) and α ($\lambda_1$) can be seen on the basis of different distances of the points of incidence of the illuminating beam bundles 6, 7 from the edge region of the reticle 1.

First and second mirror elements 8, 9, which are known per se, are placed adjoining the edge regions of the reticle 1. An LED 10 with the wavelength $\lambda_0$ is connected to the first mirror element 8 and an LED 11 with the wavelength $\lambda_1$ is connected to the second mirror element 9. The surface region 2 with the grating structure is located in the second focal point of the respective mirror elements 8, 9.

If the difference between the wavelengths and thus the difference between the necessary angles of incidence is sufficiently great, it is also possible for two coupling-in elements to be attached successively on one edge side of the reticle. Together with the illumination which is coupled in on the opposite side, the grating structure can in this case also be illuminated with more than two colors.

In the case of the arrangement of the illuminating apparatuses for different wavelengths, it is also possible to use different numbers of total internal reflections in the reticle for producing the necessary different angles of incidence.

An apparatus can be provided for a continuous change in the colors and thus the wavelengths, which are emitted by an LED, in which apparatus the LED and the associated mirror elements are rotated such that the angle of incidence α satisfies the prescribed functional dependence, wherein the imaging of the LED onto the grating structure remains. In this case, the LED can be moved with the mirror element via a mechanical cam.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto.

What is claimed is:

1. An apparatus for illuminating a marking, which is applied on a planar transparent reticle in the form of a diffraction structure,
    wherein the reticle has a first face and a second face opposed to the first face,
    wherein illuminating beams are injected into the reticle via a side edge surface of the reticle such that they are emitted after diffraction at the marking perpendicular to a plane of the reticle,
    wherein a first mirror is a concavely curved mirror having two focal points and is attached to the side edge surface such that a first light source is arranged in a region of the first focal point and the marking is arranged in a region of the second focal point,
    wherein a second mirror is a concavely curved mirror having two focal points and is attached to the side edge surface such that a second light source with a second emission wavelength, different from a first emission wavelength of the first light source, is arranged in a region of the first focal point of the second mirror, and the marking is arranged in a region of the second focal point of the second mirror,
    wherein the first emission wavelength is reflected on the first face at a first distance from an optical axis of the reticle,
    wherein the second emission wavelength is reflected on the first face at a second distance from the optical axis that differs from the first distance, and
    wherein an angle of incidence of light from the first light source on the marking is different from an angle of incidence of light from the second light source on the marking such that light from the first light source has an angle of emission from the marking that is the same as an angle of emission from the marking of light from the second light source.

2. The apparatus of claim 1, wherein the second mirror is attached to the side edge surface diametrically with respect to the first mirror.

* * * * *